United States Patent Office 3,323,986
Patented June 6, 1967

3,323,986
METHOD FOR CONTROL OF POWDERY MILDEW
Krijn van den Boogaart, Vlaardingen, Netherlands, assignor to N.V. Fabriek Van Chemische Producten Vondelingenplaat, Hoogvliet, Netherlands, a corporation of the Netherlands
No Drawing. Filed Jan. 25, 1965, Ser. No. 427,961
5 Claims. (Cl. 167—22)

This invention relates to a method for the control of powdery mildew and to compositions which provide excellent powdery mildew control. More particularly, the invention is concerned with the use of certain asymmetric thiuram monosulfides as active agents for control of powdery mildew.

Powery mildew is a fungus which causes numerous diseases on fruits, vegetables, berries, flows, tobacco, grasses and cereals, and such diseases are responsible for large economic losses in the agricultural fields. Powdery mildew of roses, strawberries, peaches, peas, clover, grasses and cereals is caused by the mildew of the erysiphaceae family. Powdery mildews of apples, cherries and other fruits is caused by species in the perisporiaceae family. Other examples of the wide variety of powdery mildew diseases are indicated at pages 583 to 586 of the text by Heald, "Manual of Plant Diseases," 1933, McGraw-Hill Book Company, Inc. The causal organisms of powdery mildew belong to several genera of fungi having a morphological and physiological similarity in that they possess mycelium and fruiting structures which are resistant to desiccation and which can exist on the plant leaf or stem. The group is quite resistant to most organic fungicides presumably because of this marked difference from other fungi which live internally in the host tissue.

Heretofore, powdery mildew has been treated by numerous techniques, but none of them is entirely satisfactory. Lime-sulfur mixtures are often effective, but are limited in their use to well-pruned, well-cared for orchards because of possible phytotoxic effects on foliage. Other commercial, agricultural fungicides, such as the zinc and iron salts of dimethyldithiocarbamic acid, the zinc and manganese salts of ethylene bisdithiocarbamic acid (Zineb and Maneb) are not as effective as lime-sulfur. The compound 4,6-dinitro-2-caprylphenyl crotonate (Karathane) is considered an excellent agent for treating powdery mildew, but it has a limited range of safety to plant foliage. Thus, although some of these known fungicides show activity against powdery mildew, they are limited either in effectiveness or safety to plant foliage.

Certain asymmetric thiuram monosulfides have been disclosed heretofore as anticryptogamic agents (e.g. fungicides). For example U.S. 2,139,935 suggests are the compound of structure

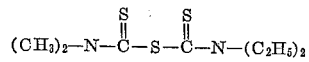

has anticryptogamic effects. Evaluation of this compound and its close homologues and analogues against powdery mildew; however, indicates that it is poorly effective, at best, and much inferior to commercially available agents such as Karathane.

Surprisingly, it has now been found, in accord with this invention, that excellent and economic control of powdery mildew may be obtained by using as the active agent an asymmetric thiuram monosulfide having the structure:

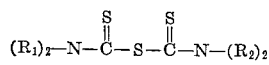

where $R_1$ is an alkyl group containing from one to two carbon atoms (e.g. methyl and ethyl) and $R_2$ is an alkyl radical selected from the group consisting of n-propyl and iso-butyl. Further, in accord with this invention, control of powdery mildew on plants may be obtained by treating said plants with a composition comprising a carrier and a powdery mildew controlling amount of the asymmetric thiuram monosulfide described above.

The active agents useful in this invention are known compounds readily prepared in accordance with the procedures disclosed in U.S. 2,524,081 and 2,139,935.

The procedures which will be used for applying the active compositions to the plants will be in accord with usual practices. Since the active compound has limited water solubility, the active compounds will usually be applied to the plants as an aqueous dispersion which is preferably obtained from a wettable powder. In a preferred embodiment of the invention, the concentrate of the active agent together with a carrier and containing a surfactant will be manufactured and sold as an article of commerce. Preferably, this concentrate will be in the form of a wettable powder, made simply by blending the active agent with a carrier, such as a clay or other finely divided or particulate inert matter, e.g. attapulgite, bentonite, vermiculite, and the like. As a surfactant, there may be used one or more of the many surface active agents generally employed, such as a polyalkylene oxide, a ligninsulfonate, or the various other cationic, anionic, and nonionic surfactants available for such purposes. Generally, the wettable powder concentrate will contain from about 5 to about 90% by weight of an active agent, the balance being the carrier and surfactant.

Alternatively, the active agents may be formulated in organic solvent systems as a solution, emulsion or suspension concentrate containing from 5 to 90% by weight of active agent and the organic solvent system dispersed in water just prior to use. Generally, the organic material will be an aromatic hydrocarbon solvent, such as xylene, toluene, etc., but other solvent systems such as ketones (methyl ethyl ketone, acetone, etc.), aliphatic amides, such as dimethylformamide, dimethylacetamide, ketoalcohols (diacetone alcohol) and the like, may also be used.

The rate of application of the fungicides onto the plant, flower or crop to be treated will vary between about 0.65 to 10 pounds per acre of active material. Preferably, and for economic reasons, the rate of application will be from 0.1 to 5.0 pounds per acre using concentrations of from 0.5 to 2 pounds per gallon for tree applications. Application is made in the usual manner by spraying an aqueous dispersion of the agent onto the plant and treatment in this manner enables control of powdery mildew to be obtained.

In order to more fully illustrate the invention, the following examples are given:

EXAMPLE 1.—FORMULATIONS USEFUL

A. *Wettable powder*

| | Percent by weight |
|---|---|
| N-dimethyl-N'-di-n-propyl thiuram sulfide | 50 |
| Surfactants: Sodium lignosulfonate ("Marasperse" N) | 2 |
| Alkylphenoxypoly(ethyleneoxy)ethanol ("Igepal" RC–760) | 2 |
| Carrier: Attapulgite ("Attaclay") | 46 |

B. *Aqueous ball milled dispersion*

Ten parts by weight of N-diethyl-N'-di-isobutylthiuram sulfide and 90 parts by weight of water are ball milled in the presence of an alkyl urea polyether alcohol surfactant until a stable dispersion is obtained.

EXAMPLE 2.—EVALUATION OF AGENTS

The active agents were evaluated by spraying gherkin plants having newly developed cotyledons with a water dispersion containing the active agent, the spraying being done at various concentrations. Subsequent to the spray treatment and after the sprayed plants had dried, the plants were inoculated with cultures of powdery mildew (*Erysiphe cichoracearum*). The treated plants were inspected after various times and the percentage of infection was determined.

The following tables indicate the results of comparative tests:

TABLE I

| | | Percent Mildew Observed After— | | | | | | | |
|---|---|---|---|---|---|---|---|---|---|
| | | 10 days | | | 14 days | | | 18 days | | |
| Agent Tested: None | | --- | | | --- | | | --- | | |
| | | Test Concentration (Percent) | | | | | | | |
| | | 1/4 | 1/8 | 1/16 | 1/4 | 1/8 | 1/16 | 1/4 | 1/8 | 1/16 |
| Asymmetric thiuram sulfide: | | | | | | | | | | |
| $R_1$ | $R_2$ | | | | | | | | | |
| $CH_3$ | $C_2H_5$ | 0 | 0 | 1 | 0 | 0 | 5 | 0 | 2.1 | 9.1 |
| $CH_3$ | $i-C_3H_7$ | 0 | 0 | 0 | 0 | 1 | 7.6 | 0 | 1.8 | 9.6 |
| $CH_3$ | $iso-C_4H_9$ | 0 | 0 | 0 | 0 | 0 | 0 | 0 | 0 | 0 |

It is clear from Table I that the N-dimethyl-N'-di-isobutyl thiuram sulfide is surprisingly superior to its closely related homologues. Further evidence of this will be seen in the following tables.

TABLE II

| | | Percent Mildew Observed After— | | | | | | | |
|---|---|---|---|---|---|---|---|---|---|
| | | 10 days | | | 14 days | | | 17 days | | |
| Agent Tested: None | | 40.6 | | | 63.5 | | | 97.0 | | |
| | | Test Concentration (Percent) | | | | | | | |
| | | 1/40 | 1/80 | 1/160 | 1/40 | 1/80 | 1/160 | 1/40 | 1/80 | 1/160 |
| Karathane | | 0 | 0 | 0 | 0.03 | 0 | 0.05 | 0.15 | 0.03 | 0.05 |
| Asymmetric thiuram sulfide: | | | | | | | | | | |
| $R_1$ | $R_2$ | | | | | | | | | |
| $CH_3$ | $iso-C_4H_9$ | 0 | 0 | 0 | 0 | 0.1 | 0.06 | 0 | 0.35 | 1.85 |
| $C_2H_5$ | $iso-C_4H_9$ | 0 | 0 | 1 | 0.6 | 0.4 | 2.2 | 0.6 | 0.4 | 4.2 |
| $C_2H_5$ | $n-C_3H_7$ | 0 | 0 | 0.3 | 0.1 | 0 | 0.7 | 0.05 | 0 | 1.3 |
| $CH_3$ | $n-C_3H_7$ | 0 | 0 | 0.05 | 0.3 | 0.7 | 0.75 | 0.3 | 1.2 | 1.5 |
| $C_2H_5$ | $iso-C_3H_7$ | 0 | 0 | 0.75 | 0.6 | 1.0 | 6.25 | 0.9 | 1.8 | 11.2 |

Again it is clear from the above data that the N-diethyl-N'-di-isopropyl thiuram sulfide is greatly inferior to the active asymmetric thiuram sulfides included in this invention.

TABLE III.—ACTIVITY AGAINST WHEAT MILDEW (*Erysiphe grammis*)

| | | Percent Mildew Observed After— | | | | | | | |
|---|---|---|---|---|---|---|---|---|---|
| | | 12 days | | | | 16 days | | | |
| Agent Tested: None | | 19.12 | | | | 25.98 | | | |
| | | Test Concentration (Percent) | | | | | | | |
| | | 1/4 | 1/8 | 1/16 | 1/32 | 1/4 | 1/8 | 1/16 | 1/32 |
| Wettable sulfur [1] | | 1.69 | 7.28 | --- | --- | 2.60 | 7.96 | --- | --- |
| Asymmetric thiuram sulfide: | | | | | | | | | |
| $R_1$ | $R_2$ | | | | | | | | |
| $CH_3$ | $iso-C_4H_9$ | 0.06 | 0.08 | 0.21 | 0.45 | 0.05 | 0.19 | 0.20 | 0.83 |
| $CH_3$ | $iso-C_3H_7$ | 0.57 | 1.12 | 5.93 | 8.96 | 0.97 | 2.31 | 7.84 | 10.22 |

[1] 92% active formulation.

The surprising difference between homologues is again evident from Table III and it is also clear that the use of the invention is a vast improvement over the use of sulfur against wheat mildew.

TABLE IV

| Agent Tested: None | Percent Mildew After | | | | | | | |
|---|---|---|---|---|---|---|---|---|
| | 10 days | | | | 14 days | | | |
| | 23 | | | | 65.5 | | | |
| | Test Concentration (Percent) | | | | | | | |
| | 1/10 | 1/20 | 1/40 | 1/80 | 1/10 | 1/20 | 1/40 | 1/80 |
| Karathane | 0 | 0 | 0 | 0 | 0 | 0 | 0.3 | 1.3 |

Asymmetric thiuram sulfide:

| $R_1$ | $R_2$ | 1/10 | 1/20 | 1/40 | 1/80 | 1/10 | 1/20 | 1/40 | 1/80 |
|---|---|---|---|---|---|---|---|---|---|
| $CH_3$ | iso-$C_4H_9$ | 0 | 0 | 0 | 0 | 0 | 0 | 0.3 | 0.9 |
| $CH_3$ | n-$C_3H_7$ | 0 | 0 | 0.05 | 1.5 | 0 | 0 | 0.7 | 3.7 |
| $C_2H_5$ | iso-$C_4H_9$ | 0 | 0 | 0 | 0 | 0 | 0 | 0 | 0.7 |
| $C_2H_5$ | n-$C_3H_7$ | 0 | 0 | 0 | 0 | 0 | 0 | 1.0 | 1.3 |
| $C_2H_5$ | iso-$C_3H_7$ | 0 | 0 | 0.1 | 10 | 0 | 0.8 | 1.9 | 34 |

In similar tests it was found that N-dimethyl-N'-di-n-propyl thiuram sulfide was significantly superior to N-dimethyl-N'-di-n-butylthiuram sulfide and experimental evidence also showed the unexpected significant superiority of the isobutyl group in the compounds used in the invention over compounds containing the n-butyl group.

It will be understood that numerous changes and variations may be made from the above description and examples without departing from the spirit and scope of the invention.

I claim:
1. A method for controlling powdery mildew on plants, which comprises applying to said plants a powdery mildew controlling amount of a compound of structure

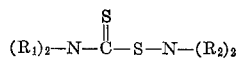

wherein $R_1$ is an alkyl group containing one to two carbon atoms and $R_2$ is selected from the group consisting of n-propyl and isobutyl.

2. A method for the control of powdery mildew on plants as in claim 6 which comprises treating said plants with N-dimethyl-N'-di-n-propyl thiuram sulfide.

3. The method of claim 2 where the active agent is N-dimethyl-N'-di-isobutyl thiuram sulfide.

4. The method of claim 2 where the active agent is N-diethyl-N'-di-n-propyl thiuram sulfide.

5. The method of claim 2 where the active agent is N-diethyl-N'-diisobutyl thiuram sulfide.

References Cited
UNITED STATES PATENTS

| | | | |
|---|---|---|---|
| Re. 22,750 | 4/1946 | Tisdale et al. | 167—22 |
| 2,139,935 | 12/1938 | Claudin | 260—545 |
| 2,524,081 | 10/1950 | Ritter | 260—567 X |
| 2,784,223 | 3/1957 | Scalera et al. | 260—534 |
| 2,937,147 | 5/1960 | Goldwasser | 252—107 |
| 3,202,571 | 8/1965 | Van den Boogart | 167—22 |
| 3,259,643 | 7/1966 | Nash | 260—429 |

LEWIS GOTTS, *Primary Examiner.*

S. K. ROSE, *Assistant Examiner.*